E. HAIMAN.
BAR FOR PLOW POINTS.
APPLICATION FILED JULY 25, 1912.
1,053,493.
Patented Feb. 18, 1913.
2 SHEETS—SHEET 1.
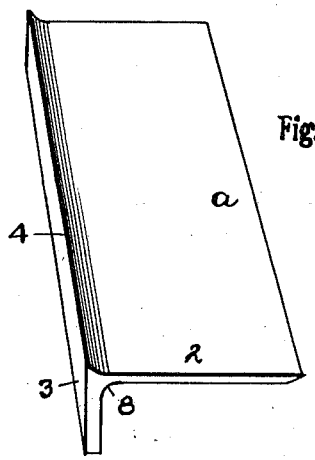
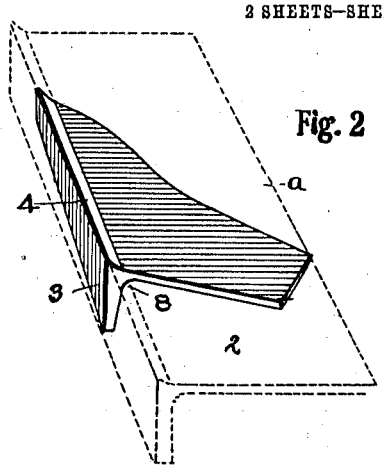
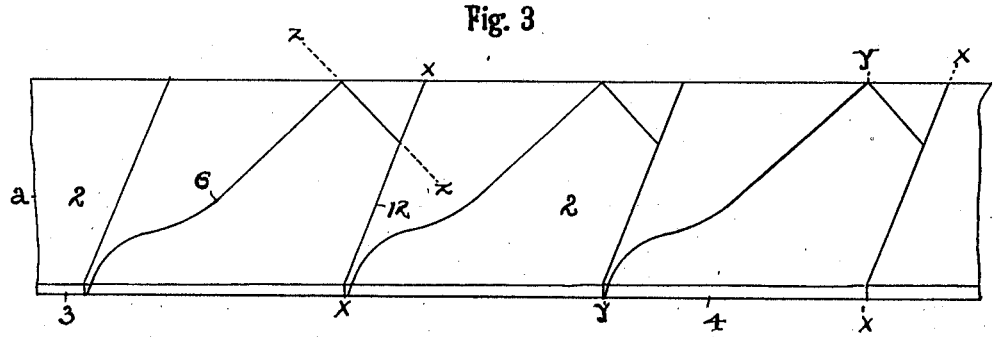
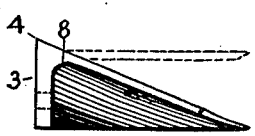
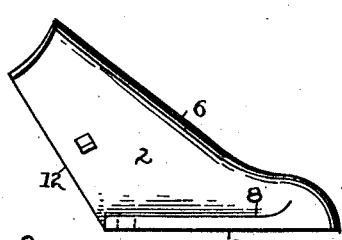
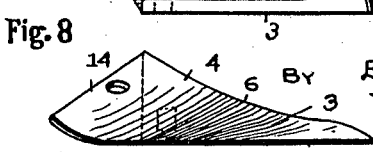
ATTEST
INVENTOR
Elias Haiman
ATT'YS

E. HAIMAN.
BAR FOR PLOW POINTS.
APPLICATION FILED JULY 25, 1912.

1,053,493.

Patented Feb. 18, 1913
2 SHEETS—SHEET 2.

ATTEST
E. M. Fisher
F. C. Mussun.

INVENTOR
Elias Haiman
BY Fisher Hllott ATTYS

UNITED STATES PATENT OFFICE.

ELIAS HAIMAN, OF CLEVELAND, OHIO, ASSIGNOR TO THE EMPIRE PLOW COMPANY, OF CLEVELAND, OHIO, A CORPORATION.

BAR FOR PLOW-POINTS.

1,053,493.

Specification of Letters Patent.

Patented Feb. 18, 1913.

Application filed July 25, 1912. Serial No. 711,409.

*To all whom it may concern:*

Be it known that I, ELIAS HAIMAN, citizen of the United States, residing at Cleveland, in the county of Cuyahoga and State of Ohio, have invented certain new and useful Improvements in Bars for Plow-Points, of which the following is a specification.

Plow points of the general character to which the present invention relates have heretofore been made by several methods, such as casting and by welding separate pieces together. The welding process contemplated the shearing off of a flat strip of steel from a suitable plate and beveling the front edge and bending the piece to the desired shape, and the next step was to cut a land side bar from a piece made up for this purpose and after splitting same and possibly otherwise putting it in shape subjecting the two pieces to welding conditions in a die and furnace wherein the said pieces were heated to a fluxing state. Then after the desired effects were obtained the welding operation was completed with a drop hammer. Several material objections to this latter method of making points are recognized, among which are the fierce heat to which the men are exposed in getting the stock to a welding condition and the manifestly slow and tedious process wherein such heating is required with the result that the high priced skilled labor the work required would have comparatively little to show for a day's work. Then in addition and as affecting the quality of the product, a lower carbon steel was usually employed than should have been so as to stand the intense welding heat required with the least possible exposure or danger. It was also found that after welding in this way the points would often be covered over more or less with pits which had to be ground out at a great expense of time and increased cost of production. By my course of manufacture I avoid these and kindred objections as I proceed with cold metal.

Figure 9:
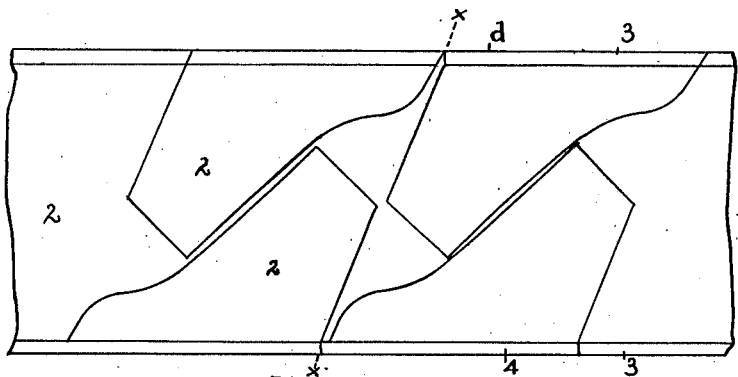
Figure 10:
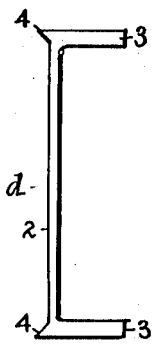
Figure 11:
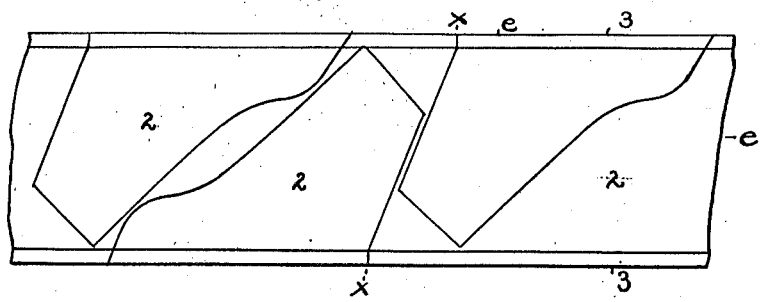
Figure 12:
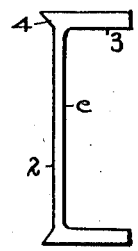
Figure 13:
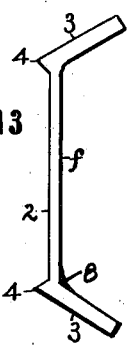
Figure 14:
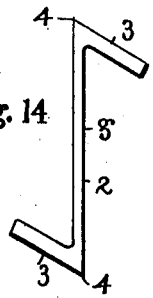
Figure 15:
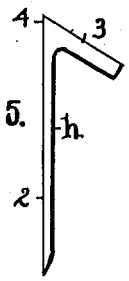

Referring to the drawings, Figure 1 is a perspective view of one form of a specially manufactured bar or piece of steel from which my point is adapted to be developed, and Fig. 2 is a perspective view of said bar or piece in dotted lines and showing a single point in full lines as cut therefrom. Fig. 3 is a plan view of a plate of greater length than in Fig. 1 and showing stock for at least three points which also are outlined therein as well as the blank sections for said points. Fig. 4 is a land side elevation of Fig. 3, but showing the point incomplete. Fig. 5 is a rear view of the point in full lines and an edge view in dotted lines before bending, and Fig. 6 is an inside or bottom view of the point serving to show the exact outline thereof at its edges. Fig. 7 is a front elevation further illustrating the outlines of the point. Fig. 8 is a top view. Fig. 9 shows a modification of the plate or bar which is of the channel iron form and of greater width than in Figs. 1 and 3 and has two edges instead of one for the land side of the point, thus providing for two sets of points to be cut from the sides thereof. Fig. 10 is an end elevation of Fig. 9. Fig. 11 shows a channel plate or bar narrower than Fig. 10 and with two land side edges and adapted to cut points from both edges alternately, the point being shown in outline as also in Fig. 9. Fig. 12 is an end elevation of Fig. 11. Figs. 13, 14 and 15 show end elevations of other and different forms of plates which can be employed for my purposes and in which the land side edges are at certain inclinations to the flat bodies of said bars.

It will be seen that each and all of the said plates indicated by *a, d, e, f, g* and *h* successively have the share sides proper indicated by 2 and the land sides by 3, and that there is a special and substantially V-shaped edge or angle 4 standing out at the junction of the portions 2 and 3 and adapted to form the cutting edge between them, as clearly seen in several figures. In Figs. 1 and 2 it is especially apparent that the said V-shaped edge has one side running into the land side of the point and the other into the more or less flat share proper as also is clear in Fig. 2. The said bar or plate in whichever of the several forms shown is rolled from a high quality of steel and worked up cold to the shape and size desired. I prefer the double-edged style of bars because they can be worked up with less scrap than the others but otherwise there is no material difference. As a first step I usually cut the bar into blanks on straight lines, say as seen at *x—x*, Fig. 3, and on corresponding lines in Figs. 9 and 11, the blank in Fig. 9 being adapted to have two points cut therefrom. Having developed said blank I proceed to produce the point therefrom. This comprises several steps, such as shearing out the share portion 2 in a suitable die and then removing a portion of the stock on the land side to develop a share corresponding substantially to the side shown in elevation Fig. 4. Or I may shear on the said line y—y, originally and not cut a blank on the lines x—x, and the waste or scrap will be the same in either case. As to these several steps or the order in which they are taken, there is necessarily the usual manufacturer's latitude and one or the other may be taken first or last and not change the result. The said share or blank is further cut at the end as on line z—z, Fig. 3.

In Fig. 4 the land side is shown as cut somewhat diagonally lengthwise with an upward curve at its middle. This is the first step in the development of this side and the next is to place the blank under a die and straighten the curved line 7 and at the same time give a proper curvature to the land cutting edge 4 at the top. In this operation the entire point may also be more or less curved from said edge 4 inward as the shape of the same requires. Or I may anticipate this bending operation in dies by using a bar which is bent at the middle to the desired curvature between the edges 6 and 12 particularly, and whatever remains to be done can be accomplished in suitable dies. I also prefer to roll the several forms or styles of bars shown with fillets 8 on the under side in the angle between the portions 2 and 3 to add strength and durability to the point. Furthermore, my improved point or share is absolutely smooth over every portion of its surface as the result of my manufacture, and there are no pits or depressions to be ground out nor other defects to remedy and the point takes and holds a higher grade of finish than formerly. The front cutting or share edge 6 and the duck bill point can be developed in one or more sets of dies in which operation the share or point may also be bent and the angular relation of the portions 2 and 3 changed relatively as shown in Fig. 5. This operation is the only one in which the point is heated at all and then not to a welding heat but rather so as to facilitate bending and shaping the share to a finish.

Obviously the land side may be made relatively lighter than shown or of the same thickness as the other portion of the point but it would not have the same length of service as a heavier one. It is to be especially noticed that the Λ shaped land cutting edge 4 is a formation which is flush with the land side 3 on its outer side but is a distinctly raised cutting edge as compared with the adjacent and top surface of the share, so that as it becomes developed in and a portion of the finished point or article of manufacture it serves as an advance cutting edge. The importance of developing this cutting edge in the original bar from which the point is formed is found in the fact that this is the only practicable way of producing said edge. It cannot be developed as a feature of the plow point after the point has been blocked out with land and share sides at right angles to each other because it is not practicable to forge the same out afterward as a distinct step in manufacture, and any attempt to do so or to produce said edge from the stock in the point blank would simply gall and weaken the point in the angle and render it practically unserviceable. I find, therefore, that in order to produce a plow point having a positive advance cutting edge as shown herein and which stands out in relief from the share and is adapted to cut much like a coulter, the same must be developed in the bar as an original formation, the same as the land side and the share side of the bar. Then, having such a bar, I can proceed with the manufacture of the point from step to step as shown and described until the perfected and original article is produced and as foreshadowed in outline in Fig. 2.

What I claim is:

1. As a new article of manufacture and sale, a bar from which to form plow points having portions at an angle to each other corresponding to the land side and the share side of the point, respectively, and the said bar having a substantially Λ shaped edge standing bodily above the plane of the said share side at the land side edge thereof.

2. A bar from which to form plow points, the same having a flat and relatively thin body corresponding to the share of the point to be formed and a side portion at an angle thereto of greater thickness than said body adapted to form the land side of the point and a substantially Λ shaped edge between said body and said side portion flush with said side portion on its outside and raised bodily above the top surface of the said body.

3. A bar for making plow points therefrom having a flat relatively thin plate shaped body and a side portion substantially twice the thickness of said body and at an angle thereto and having a Λ shaped edge between said portions on one side and a fillet in the angle between said portions on the other side.

In testimony whereof I affix my signature in presence of two witnesses.

ELIAS HAIMAN.

Witnesses:
E. M. FISHER,
F. C. MUSSUN.